N. M. BARTLETT.
HORSE COLLAR FASTENER.
APPLICATION FILED JULY 22, 1913.

1,099,836.

Patented June 9, 1914.

Witnesses:
Christ Feinle, Jr.
K. Peacock

Inventor,
Norman M. Bartlett
By Victor J. Evans
Attorney

UNITED STATES PATENT OFFICE.

NORMAN M. BARTLETT, OF BEAMSVILLE, ONTARIO, CANADA.

HORSE-COLLAR FASTENER.

1,099,836.　　　　　Specification of Letters Patent.　　Patented June 9, 1914.

Application filed July 22, 1913. Serial No. 780,610.

*To all whom it may concern:*

Be it known that I, NORMAN M. BARTLETT, a citizen of Canada, residing at Beamsville, in the Province of Ontario and Dominion of Canada, have invented new and useful Improvements in Horse-Collar Fasteners, of which the following is a specification.

This invention relates to horse collar fasteners and it includes the novel features hereinafter described and claimed.

An object of the invention is to provide a fastener of simple structure comprising members adapted to be positioned at the ends of a horse collar and which are adapted to effectually engage each other for securely holding the end portions of the collar toward each other.

With the above object in view the fastener includes a member having a curled end portion adapted to be extended around one end of the collar and which forms a guide or shield for the same. A loop is mounted upon this member and the free end portions of a spring catch extends through the said loop. The said spring catch is fixed to the member. To the other end portion of the collar is fixed a second member having upon its outer surface a series of transversely disposed ridges which are adapted to be passed through the said loop and which engage with the said catch member whereby the ends of the collar are adjustably connected with relation to each other.

Figure 1:
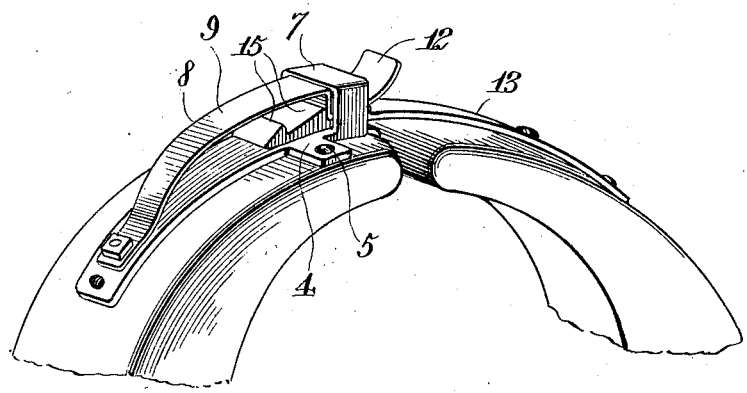
Figure 2:
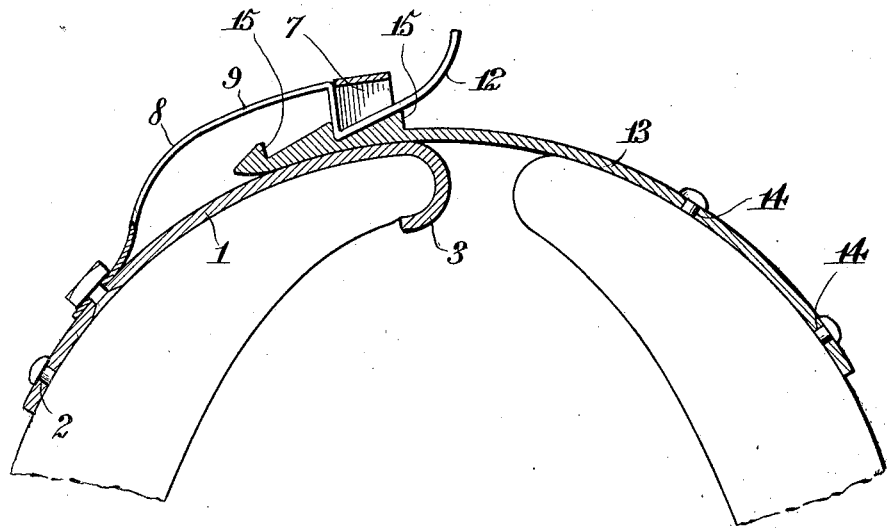

In the accompanying drawing:—Figure 1 is a perspective view of the end portions of a collar with the fastener applied. Fig. 2 is a sectional view of the same.

The fastener comprises a member 1 having at one end an aperture 2 through which a rivet or other securing device may be passed for connecting the said member with the end portion of a horse collar. At its opposite end the member 1 is provided with a bend or curl 3 which is adapted to extend around the end of the horse collar and serves to shield or protect the same. At a point between its ends the member 1 is provided at its opposite side edges with outstanding lugs 4 provided with apertures 5 through which rivets or other securing devices may be passed for assisting in holding the member 1 in position upon the collar. The member 1 is provided at a point between the lugs 4 and the curl 3 with an upstanding loop 7. A spring catch 8 is riveted or otherwise secured to the member 1 and is formed with an upwardly bowed intermediate portion 9 the upper surface of which is normally flush with the upper side of the loop 7. The catch 8 is further provided with a straight portion which is normally parallel with the edges of the loop 7 and which lies beyond one side of the said loop and in close proximity to the same. The catch 8 is further provided with a longitudinally curved extremity 12 which passes through the said loop 7. The fastener further includes a member 13 having apertures 14 through which rivets or other securing devices may be passed for securing the said member in position upon the collar. One end of the member 13 projects beyond that end of the collar upon which the said member is mounted and the said projecting end portion of the member is provided upon its upper or outer side with a series of transversely disposed ridges 15 having approximately vertical inner sides with sloping outer sides.

The operation of the fastener is as follows: To connect the member 13 with the member 1 the projecting end portion of the member 13 is passed between the extremity 12 of the catch 8 and the outer surface of the member 1. The said projecting end of the member 13 is then forced through the loop 7 and the portion 10 of the member 8 will eventually lodge against the inner side of one of the ridges 15. Thus the members are secured together. To disconnect the members the thumb is passed under the extremity 12 of the catch 8 and the said extremity is forced in an upward direction so that the lower edge of the portion 10 is lifted above the upper ends of the ridges 15. Thus the member 13 is released and the said members may be readily swung or moved away from each other.

Therefore it will be seen that a collar fastener of simple structure is provided and that the fastener includes members which may be adjustably connected with each other whereby the opposite side portions of the collar may be positioned relatively close or remote from each other as conditions require.

Having described the invention what is claimed is:—

1. A collar fastener comprising a member having at one end a curl adapted to pass around the end of the collar, said member being provided with an upstanding loop located in the vicinity of said curl, a resilient catch mounted upon said member and having an upwardly bowed intermediate portion with a straight portion located adjacent said loop and approximately parallel with the edges of the same, said catch also having a curved extremity which passes through the loop, said fastener also including a member adapted to be secured to the collar and having an end portion projecting beyond the end of the collar, said projecting end portion of the last said member being provided upon its upper side with a series of transversely disposed ridges arranged to be passed through the loop and engage the straight portion of said catch.

2. A collar fastener comprising a member having at one end a curled portion adapted to pass around the end of a collar, said member being provided at its side edges and in the vicinity of the curl with outstanding lugs, a loop carried by said member and located between the lugs and the curl and extending above the upper surface of the member, a resilient catch fixed to said member and having an intermediate bowed portion the upper surface of which is approximately flush with the upper surface of the loop, said catch member also having a straight portion which lies approximately parallel with the side edges of the loop in close proximity to the side of the loop, said catch member also having a longitudinally curved extremity which passes through the loop, the fastener also including a member adapted to be secured to the collar and having an end portion which projects beyond the end of the collar, the last mentioned member being provided upon its upper surface and beyond the end of the collar with transversely disposed ridges arranged to be passed through the loop and engage the straight portion of the said catch.

In testimony whereof I affix my signature in presence of two witnesses.

NORMAN M. BARTLETT.

Witnesses:
C. A. BARTLETT,
F. E. JARDESON.

Copies of this patent may be obtained for five cents each, by addressing the "Commissioner of Patents, Washington, D. C."